United States Patent
Lucas

(10) Patent No.: US 8,113,583 B2
(45) Date of Patent: Feb. 14, 2012

(54) PROSTATE GOLF SEAT

(76) Inventor: Eugene Daniel Lucas, Dunmore, PA (US)

(*) Notice: Subject to any disclaimer, the term of this patent is extended or adjusted under 35 U.S.C. 154(b) by 62 days.

(21) Appl. No.: 12/320,158

(22) Filed: Apr. 9, 2009

(65) Prior Publication Data

US 2010/0259088 A1 Oct. 14, 2010

(51) Int. Cl.
*A47C 15/00* (2006.01)
(52) U.S. Cl. .......... 297/232; 297/248; 297/257
(58) Field of Classification Search .......... 297/232, 297/233, 248, 257
See application file for complete search history.

(56) References Cited

U.S. PATENT DOCUMENTS

| | | | | |
|---|---|---|---|---|
| 3,743,351 A * | 7/1973 | Harris | ............................ | 297/107 |
| 5,178,345 A * | 1/1993 | Peltola et al. | .............. | 244/118.6 |
| 5,180,120 A * | 1/1993 | Simpson et al. | ........... | 244/118.6 |
| 5,509,722 A * | 4/1996 | Beroth | ......................... | 297/452.4 |
| 6,913,318 B2 * | 7/2005 | Higley et al. | ................. | 297/383 |
| 7,648,115 B2 * | 1/2010 | Lambert et al. | ............... | 248/429 |

* cited by examiner

*Primary Examiner* — David Dunn
*Assistant Examiner* — Erika Garrett

(57) ABSTRACT

The prostate golf cart seat protects the prostate area of men from continuous bouncing by providing 1½ inches of air space between the seat and the prostate. The prostate golf cart seat may be movable or stationary. The stationary seat has two 7 inch wide spaces with 1½ inches of air space under the prostate. All seat cushions are 1½ inches thick allowing for the 1½ inches of air space between the seat and the prostate.

The movable seat has two 8 inch stationary end cushions. The center would consist of two 8 inch cushions moving along a rail which allows riders to close the 7 inch seat gap to 3 inches from the stationary end cushion. The center air space between each rider and seat of each would have a depth 1½ inches. A "T" bolt or a knurled knob is used for adjusting the seat cushions.

The stationary seat has two 7 inch wide spaces. A depth of 1½ inches between the prostate and the seat is effectuated as the seat itself is 1½ inches thick.

2 Claims, 6 Drawing Sheets

"T" Bolt

Two (2) "T" Bolts attached to rail 1 inch apart from movable seats to be threaded through one of the Five (5) nuts underneath cushion to secure seat.

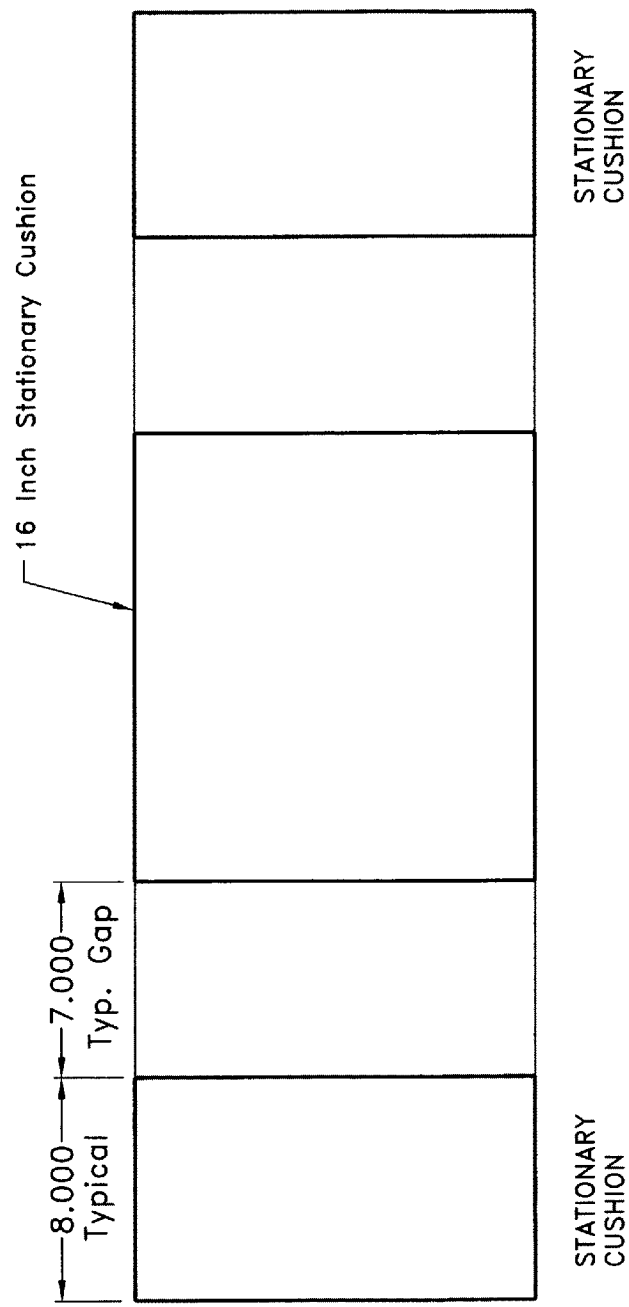

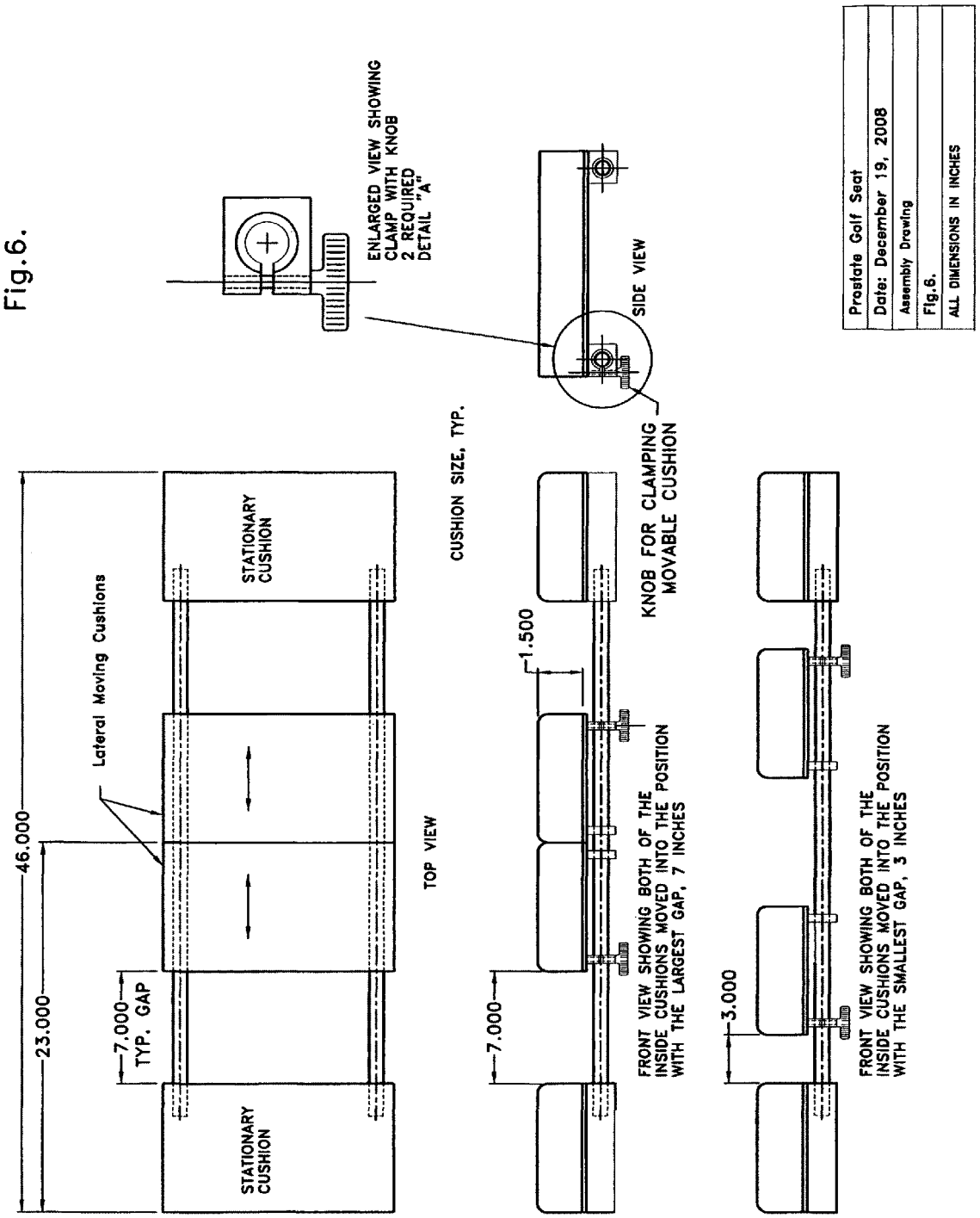

PROSTATE GOLF SEAT

RELATED APPLICATIONS

This application claims priority to U.S. Provisional application Ser. No. 12/320,158 filed Sep. 12, 2008, the benefit of which it is hereby claimed under 35 U.S.C. 119 (e).

FIELD OF INVENTION

The prostate golf cart seat allows for the prostate to ride over a 1½ inch cushion of air rather than resting directly on the seat. Prior patents have dealt with adjustments of the seat length, seat width, arm dividers, seat back adjustments and the entire seat tilt adjustment. The prostate golf cart seat has 1½ inch seat cushions which move laterally to close each rider's seat cushion from 7 inches to 3 inches to adjust to each rider's individual comfort. As men age their prostate begins to enlarge. The larger the prostate is the more impact it will have on the golf cart seat.

The present invention is designed to eliminate the impact of the prostate on the golf cart seat.

BACKGROUND OF THE INVENTION

Golf carts without prostate protection are commonly used on all golf courses today. Continuous bumping and jarring of the prostate area during the ride over time may cause the prostate to enlarge.

SUMMARY OF THE INVENTION

The present invention eliminates the impact on the prostate by providing a 1½ inch air space between the seat and the prostate. This is achieved by the use of 1½ inch seat cushions. The stationary seat has two 7 inch spaces thereby protecting both riders. The movable seat would utilizes two 7 inch spaces with each individual rider having the ability to close each seat for better comfort up to 3 inches from the outside cushion.

BRIEF DESCRIPTION OF THE DRAWINGS

The proceeding aspects and the prostate protection of this invention will become more readily appreciated as the same become better understood by reference to the enclosed detailed description in conjunction with the accompanying drawings and FIGURES, wherein:

FIG. 5 is the prostate golf cart seat top view. This is the seat version that incorporates a middle stationary cushion;

FIG. 6 is a multiple view drawing of the prostate golf cart seat. This version has the movable cushions and the "T" bolt threaded into a clamp. The clamp is shown in Detail "A". This version does not require having to remove the "T" bolt completely and place it back into a separate hole. The adjustment occurs by first loosening the "T" bolt (shown in detail "A") and then sliding the cushions into the desired position. Then the bolt is retightened to secure the seat in its adjusted spot. The figure has a top view, side view, and separate front views. One of the front views illustrates the seat in its 7 inch spacing adjustment and the other front view illustrates the seat in its 3 inch spacing adjustment.

DETAILED DESCRIPTION OF THE PROSTATE GOLF CART SEAT

Figure 1:
FIG. 1 is the prostate golf cart seat top view showing the movable cushions adjusted to the position that yields the widest gap.
Figure 2:
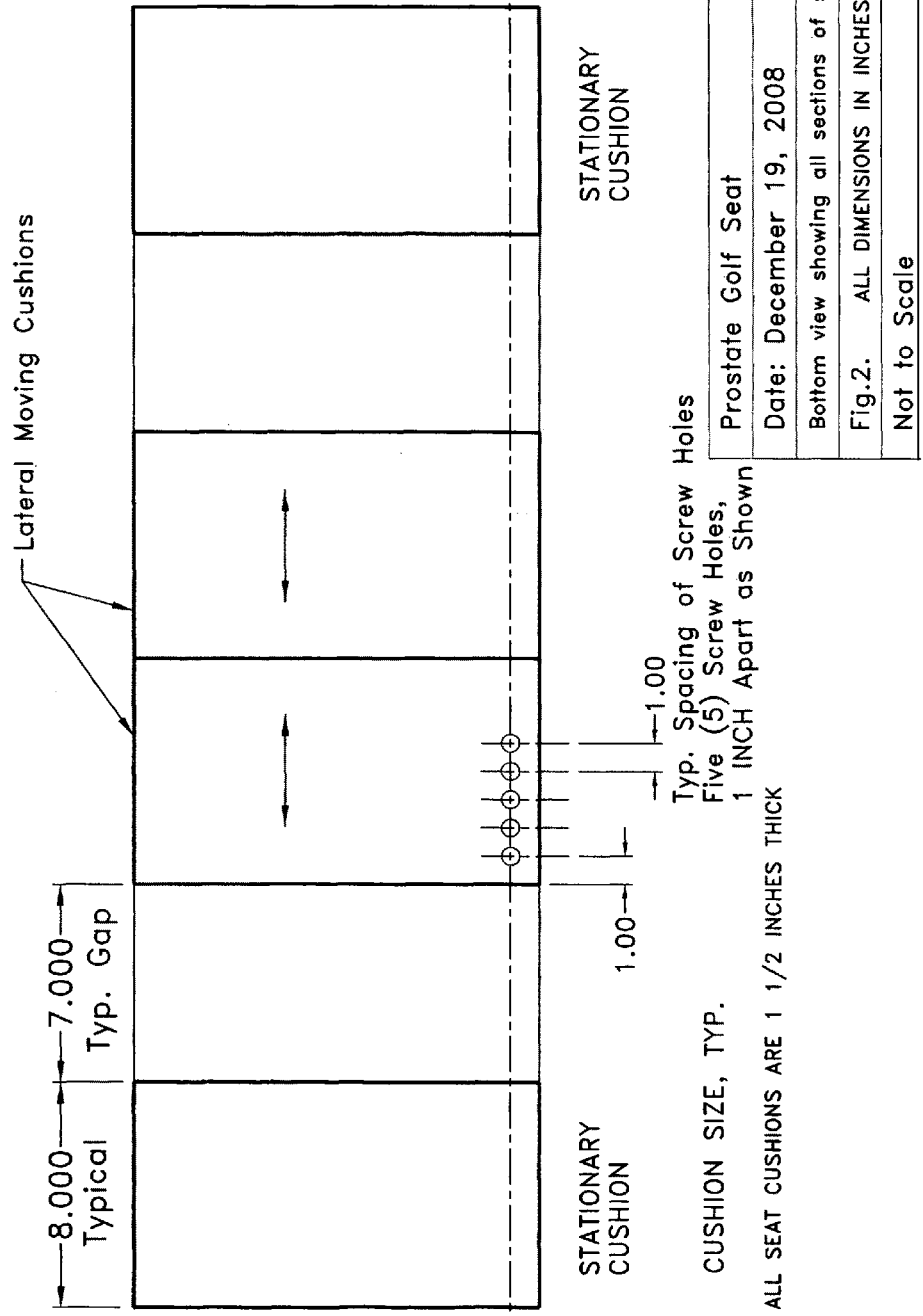
FIG. 2 is the prostate golf cart seat bottom view. This is the seat version that incorporates using the T bolt and five separate bolt holes. This figure shows the holes on the left side of the seat.
Figure 3:
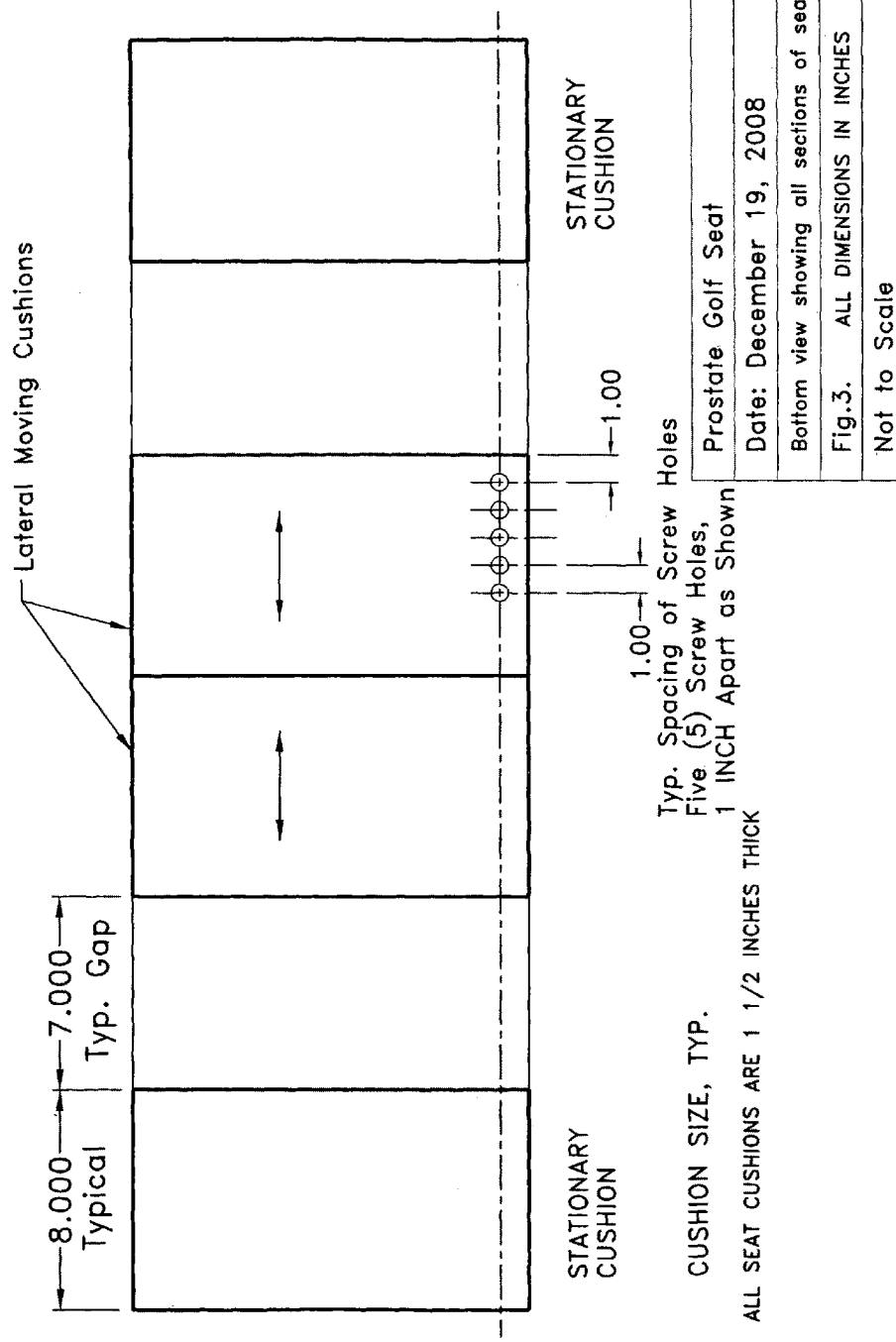
FIG. 3 is the prostate golf cart seat bottom view. This is the seat version that incorporates using the T bolt and five separate bolt holes. This figure shows the holes on the right side of the seat.
Figure 4:
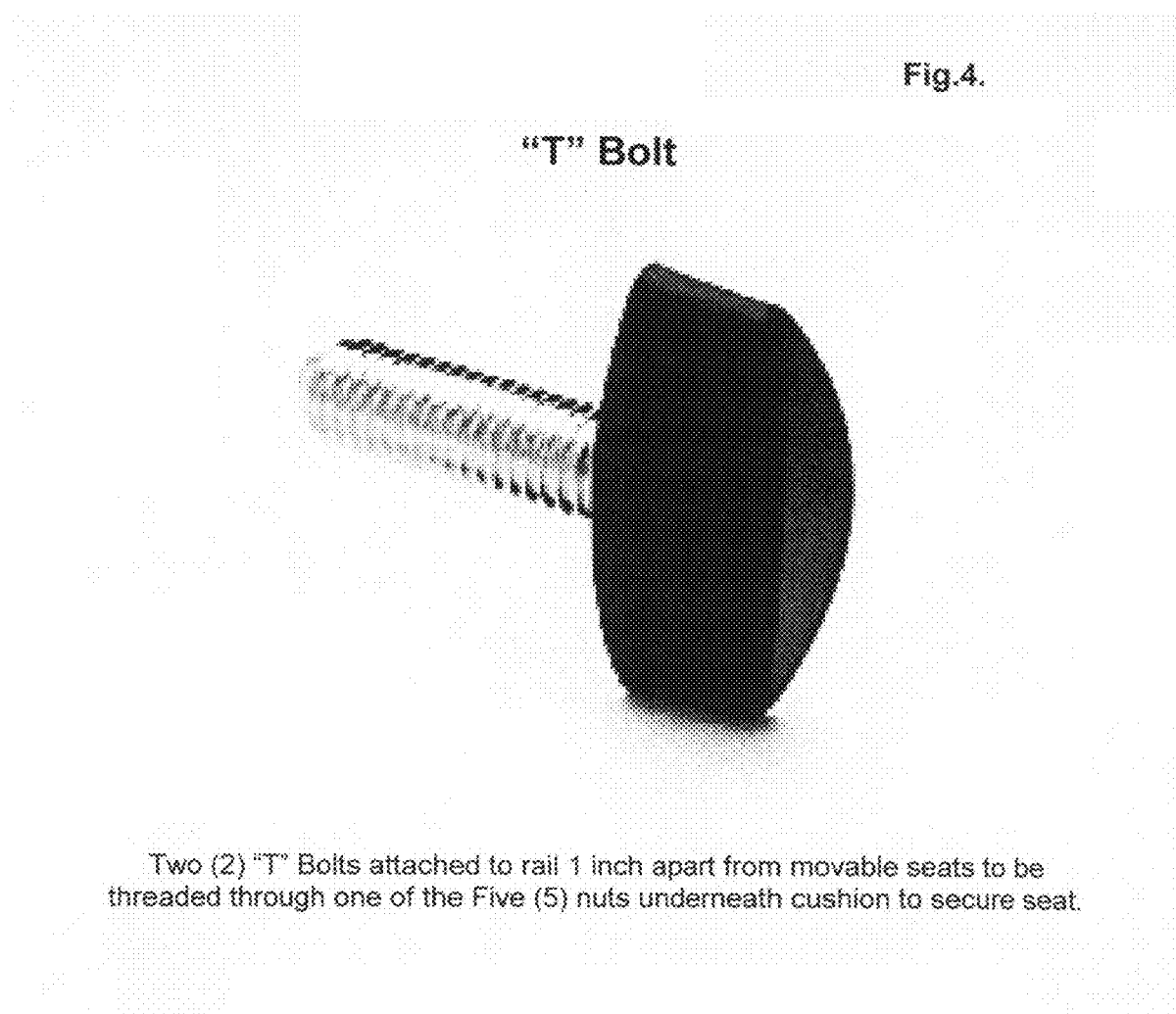
FIG. 4 is a view of the "T" Bolt that is used to lock the seat in place once the position is established.

The prostate golf cart seat consists of two (2) 1½ inch thick stationary cushions at each end of the golf cart seat with two (2) 1½ inch thick adjustable cushions in the middle allowing two golfers to laterally adjust the middle two cushions for each individual's comfort.

Conventional golf cart seats exert the rider's weight throughout the prostate area. During the ride over the golf course, a great deal of bumping occurs over the prostate area.

The prostate golf cart seat is designed to eliminate that impact. The center of the prostate golf cart seat consists of two (2) 8 inch seat cushions which move laterally away from each other allowing for adjustment by two individual golfers. By providing movable seat cushions, the seat creates a 3 inch to 7 inch space in the middle of each golfer's seat thereby eliminating any pressure inside the prostate area. Each center seat cushion may be adjusted to close the 7 inch gap to 3 inches if desired by locking the "T" bolt underneath the seat cushion into one of the five (5) nuts underneath which are spaced 1 inch apart. The elements used may be replaceable with similar elements of different materials, sizes and flexibility. The prostate golf seat may be made of metal, plastic or wood or a combination of these materials and a spring-loaded pin may replace the "T" bolt.

The seat is locked into place with a single "T" bolt located under the seat. The "T" bolt turns clockwise and connects to one of the five nuts secured to the seat cushion. The nuts in the seat cushion are 1 inch apart allowing for a larger or smaller lateral adjustment for the individual rider. The bolts thread into one of the five nuts built into the seat cushion to lock the seat in place.

The prostate golf cart seat may be fixed with no movable parts with a 7 inch gap in the center of each golfer's seat (see figure #5).

What is claimed is:

1. A prostate golf cart seat with a thickness of 1½ inches comprising:
   two outside 8 inch stationary seat cushions;
   two inside 8 inch movable seat cushions;
   wherein the movable seat cushions ride on a rail allowing each rider to adjust the movable seat cushions from 7 inches to 3 inches from the outside stationery cushions;
   whereby the space between each cushion and the rider's prostate would be 1½ inches below the rider's prostate thereby eliminating the bumping that occurs during the ride whereby the inside seat cushions allow for adjustments to close the gap from 7 inches to 3 inches if desired by locking a "T" bolt under the seat cushion into one of five nuts underneath which are spaced 1 inch apart.

2. A prostate golf cart seat having a thickness of 1½ inches comprising:
   two outside 8 inch seat cushions;
   two inside 8 inch movable seat cushions;
   wherein the movable seat cushions ride on a rail allowing each rider to adjust the movable cushion from 7 inches to 3 inches from the outside stationery cushion;

whereby the space between each cushion and the rider's prostate would be below the riders prostate thereby eliminating the bumping that occurs during the ride;

wherein the inside seat cushions can be adjusted to close the gap from 7 inches to 3 inches, if desired, by using a linear bearing which has a "T" bolt in it to secure the seat;

whereby a clamp with a slot machined into it will act as a tightening device to secure the seat into the rider's desired position and a ¼-20 machine thread tapped through it with a ¼ inch knurled knob threaded into the clamp which when tightened locks the seat into the desired position;

whereby to readjust the seat for another rider, the knurled knob can be loosened to allow the cushion to slide into the desired position.

* * * * *